US006950629B2

(12) United States Patent
Nagy

(10) Patent No.: US 6,950,629 B2
(45) Date of Patent: Sep. 27, 2005

(54) SELF-STRUCTURING ANTENNA SYSTEM WITH MEMORY

(75) Inventor: Louis L. Nagy, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/763,910

(22) Filed: Jan. 23, 2004

(65) Prior Publication Data

US 2005/0164640 A1 Jul. 28, 2005

(51) Int. Cl.[7] .......................... H04B 15/00; H01Q 3/00; H01Q 3/24

(52) U.S. Cl. ..................... 455/63.4; 342/359; 342/374; 455/69; 455/277.2

(58) Field of Search ................................ 342/374, 359; 455/63.4, 69, 275, 277.1, 277.2, 562.1

(56) References Cited

U.S. PATENT DOCUMENTS 6,175,723 B1 * 1/2001 Rothwell, III .............. 342/359

OTHER PUBLICATIONS

J. E.Ross et al, "Numerical Simulation of a Self-Structuring Antennas Based on a Genetic Algorithm Optimization Scheme," 2000 AP-S/URSI Symposium, Salt Lake City, UT, Jul. 2000.*

C.M. Coleman et al., "Application of Two-Level Evolutionary Algorithms to Self-Structuring Antennas," 2001 URSI National Radio Science Meeting, Boston, MA, Jul. 2001.*

C.M. Coleman et al., Self-structuring antennas, IEEE Antennas and Propagation Magazine, vol. 44(3), p. 11-23, Jun. 2002.*

C.M. Coleman et al., Investigation of Simulated annealing, ant-colony optimization, and genetic algorithms for self-structuring antennas, IEEE Transactions on Antennas and Propagation, vol. 52(4), p. 1007-1014, Apr. 2004.*

* cited by examiner

*Primary Examiner*—Thomas H. Tarcza
*Assistant Examiner*—F H Mull
(74) *Attorney, Agent, or Firm*—Stefan V. Chmielewski

(57) ABSTRACT

A self-structuring antenna (SSA) system employs a memory device to store switch states for antenna configurations that are determined to produce acceptable antenna characteristics. Each antenna configuration corresponds to a respective combination of switch states known as a switch configuration. Using the stored antenna configurations as a starting point for the process of searching for an antenna configuration that produces acceptable antenna characteristics under particular operating conditions may reduce the search time.

28 Claims, 2 Drawing Sheets

SELF-STRUCTURING ANTENNA SYSTEM WITH MEMORY

TECHNICAL FIELD

This disclosure relates generally to communication services. More particularly, this disclosure relates to self-structuring antenna systems.

BACKGROUND OF THE DISCLOSURE

The vast majority of vehicles currently in use incorporate vehicle communication systems for receiving or transmitting signals. For example, vehicle audio systems provide information and entertainment to many motorists daily. These audio systems typically include an AM/FM radio receiver that receives radio frequency (RF) signals. These RF signals are then processed and rendered as audio output. A vehicle communication system may incorporate other functions, including, but not limited to, wireless data and voice communications, global positioning system (GPS) functionality, satellite-based digital audio radio (SDAR) services. The vehicle communication system may also incorporate remote function access (RFA) capabilities, such as keyless entry, remote vehicle starting, seat adjustment, and mirror adjustment.

Communication systems, including vehicle communication systems, typically employ antenna systems including one or more antennas to receive or transmit electromagnetic radiated signals. In general, such antenna systems have predetermined patterns and frequency characteristics. These predetermined characteristics are selected in view of various factors, including, for example, the ideal antenna RF design, physical antenna structure limitations, and mobile environment requirements. Because these factors often compete with each other, the resulting antenna design typically reflects a compromise. For example, an antenna system for use in an automobile or other vehicle preferably operates effectively over several frequency bands (e.g., AM radio, FM radio, television, remote function access (RFA), wireless data and voice communications, GPS, and SDARS), has distinctive narrowband and broadband frequency characteristics and distinctive antenna pattern characteristics within each such band. Such an antenna system also preferably is capable of operating effectively in view of the structure of the vehicle body (i.e., a large conducting structure with several aperture openings). The operating characteristics, e.g., transmit and receive characteristics, of such an antenna system preferably are independent of the vehicle body style and of vehicle orientation and weather conditions. To accommodate these design considerations, a conventional vehicle antenna system can use several independent antenna systems and still only marginally satisfy basic design specifications.

Significant improvement in mobile antenna performance can be achieved using an antenna that can alter its RF characteristics in response to changing electrical and physical conditions. One type of antenna system that has been proposed to achieve this objective is known as a self-structuring antenna (SSA) system. An example of a conventional SSA system is disclosed in U.S. Pat. No. 6,175,723, entitled "SELF-STRUCTURING ANTENNA SYSTEM WITH A SWITCHABLE ANTENNA ARRAY AND AN OPTIMIZING CONTROLLER," issued on Jan. 16, 2001 to Rothwell III, and assigned to the Board of Trustees operating Michigan State University ("the '723 patent"). The SSA system disclosed in the '723 patent employs antenna elements that can be electrically connected to one another via a series of switches to adjust the RF characteristics of the SSA system as a function of the communication application or applications and the operating environment. A feedback signal provides an indication of antenna performance and is provided to a control system, such as a microcontroller or microcomputer, that selectively opens and closes the switches. The control system is programmed to selectively open and close the switches in such a way as to improve antenna optimization and performance.

Conventional SSA systems may employ several switches in a multitude of possible configurations or states. For example, an SSA system that has 24 switches, each of which can be placed in an open state or a closed state, can assume any of 16,777,216 ($2^{24}$) configurations or states. Assuming that selecting a potential switch state, setting the selected switch state, and evaluating the performance of the SSA using the set switch state each take 1 ms, the total time to investigate all 16,777,216 configurations to select an optimal configuration is 50,331.6 seconds, or approximately 13.98 hours. During this time, the SSA system loses acceptable signal reception.

The search time associated with selecting a switch configuration may be improved by limiting the number of configurations that may be selected. For example, if the control system only evaluates 0.001% of the possible switch configurations, the search time can be reduced to slightly less than a second. Laboratory experiments have demonstrated that search times can be made significantly shorter. Nevertheless, the loss of acceptable signal reception every time an SSA system is tuned to a new station, channel, or band is still a significant problem.

SUMMARY OF VARIOUS EMBODIMENTS

According to various example embodiments, a self-structuring antenna (SSA) system employs a memory device to store switch states for antenna configurations that are determined to produce acceptable antenna characteristics. Each antenna configuration corresponds to a respective combination of switch states known as a switch configuration.

One embodiment is directed to an antenna system that includes a plurality of antenna elements and a plurality of switching elements arranged with the antenna elements. When selectively closed, the switching elements electrically couple selected ones of the antenna elements to one another to generate an antenna configuration selected from a plurality of antenna configurations. A control arrangement is operatively coupled to the switching elements and is configured to close selected switching elements as a function of the selected antenna configuration. A memory is operatively coupled to the control arrangement and is configured to store data representing at least some of the plurality of antenna configurations and to selectively update the data.

In another embodiment, a communication system includes a receiver that is configured to generate a control signal in response to a radiated electromagnetic signal. Antenna elements are operatively coupled to the receiver and arranged to receive the radiated electromagnetic signal. Switching elements are arranged with the antenna elements to, when selectively closed, electrically couple selected antenna elements to one another. A memory is configured to store data representing a plurality of antenna configurations. A processor arrangement is operatively coupled to the memory and is operatively coupled to receive the control signal. The processor arrangement is configured to select an antenna configuration in response to the control signal and to selectively update the data stored in the memory in response to the control signal. A switch controller is operatively coupled to the plurality of switching elements and to the processor arrangement. The switch processor is configured to close selected ones of the switching elements as a function of the selected antenna configuration.

Another embodiment is directed to a method of configuring an antenna system comprising a plurality of antenna elements. An antenna configuration is selected from a plurality of antenna configurations in response to a received control signal. A memory is controlled to output data representing the selected antenna configuration. Switching elements are configured in response to the output data to electrically couple selected antenna elements to one another, thereby generating the selected antenna configuration. The data stored in the memory is updated as a function of the control signal. This method may be embodied in a processor-readable medium storing processor-executable instructions.

Various embodiments may provide certain advantages. For instance, using the stored antenna configurations as a starting point for the process of searching for an antenna configuration that produces acceptable antenna characteristics under particular operating conditions may reduce the search time.

Additional objects, advantages, and features will become apparent from the following description and the claims that follow, considered in conjunction with the accompanying drawings.

DESCRIPTION OF VARIOUS EMBODIMENTS

A self-structuring antenna (SSA) system employs a memory device to store switch states for antenna configurations that are determined to produce acceptable antenna characteristics. Each antenna configuration corresponds to a respective combination of switch states known as a switch configuration. Using the stored antenna configurations as a starting point for the process of searching for an antenna configuration that produces acceptable antenna characteristics under particular operating conditions may reduce the search time.

In the following description, numerous specific details are set forth in order to provide a thorough understanding of various embodiments of the present invention. It will be apparent to one skilled in the art that the present invention may be practiced without some or all of these specific details. In other instances, well known components and process steps have not been described in detail in order to avoid unnecessarily obscuring the present invention.

Some embodiments may be described in the general context of processor-executable instructions, such as program modules, being executed by a processor. Generally, program modules include routines, programs, objects, components, data structures, etc., that perform particular tasks or implement particular abstract data types.

Figure 1:
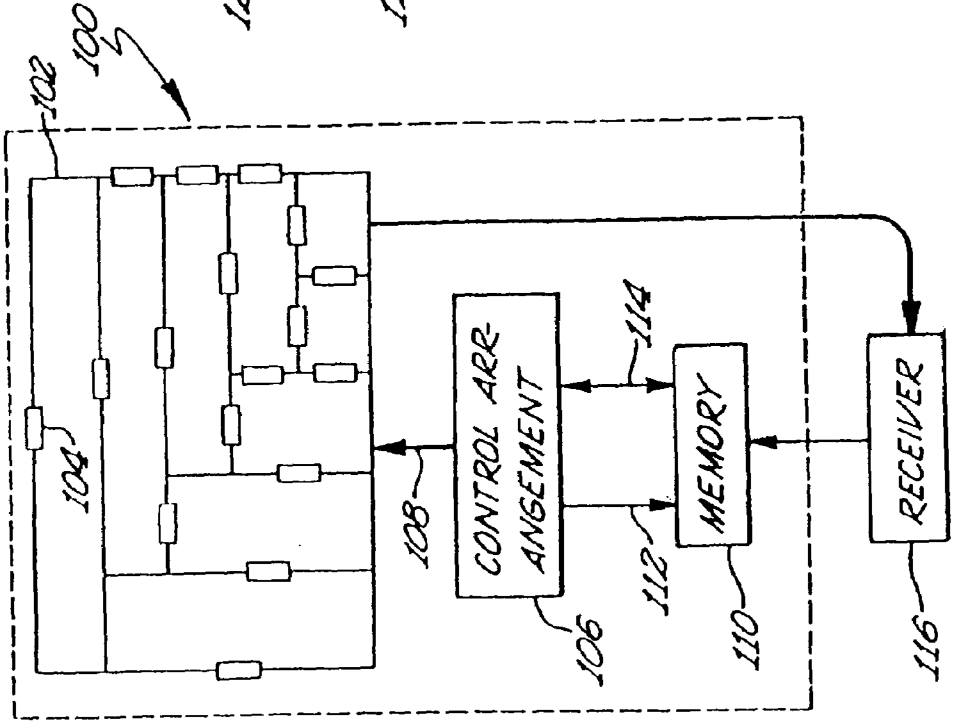
FIG. 1 is a block diagram illustrating an example antenna system according to an embodiment.

Referring now to the drawings, FIG. 1 illustrates an example antenna system 100 according to one embodiment. Antenna elements 102 are arranged with switching elements 104 in a pattern, such as the example pattern depicted in FIG. 1. Those skilled in the art will appreciate that the antenna elements 102 and the switching elements 104 can be arranged in patterns other than the example pattern depicted in FIG. 1. Such patterns can be designed for acceptable performance under certain operating conditions. The antenna elements 102, indicated by solid line segments in FIG. 1, can be implemented by wires or other conductors, including but not limited to conductive traces. Patches or other radiating devices may also be used to implement one or more of the antenna elements 102. The switching elements 104, indicated by rectangles in FIG. 1, are controllable to be placed in an open state or a closed state via application of an appropriate control voltage or control signal. The switching elements 104 may be implemented using bipolar junction transistors (BJTs) controlled by applying an appropriate base voltage. Alternatively, the switching elements 104 may be implemented using field-effect transistors (FETs) controlled by applying an appropriate gate voltage. The switching elements 104 may also be implemented using a combination of BJTs and FETs and possibly other devices well-known to those of ordinary skill in the art, including more complex devices, such as integrated circuits (ICs). As another alternative, the switching elements 104 can be implemented using mechanical devices, such as relays or miniature electromechanical system (MEMS) switches. For purposes of clarity, control terminals and control lines connected to individual switching elements 104 are not illustrated.

Closing a switching element 104 establishes an electrical connection between any antenna elements 102 to which the switching element 104 is connected. Opening a switching element 104 disconnects the antenna elements 102 to which the switching element 104 is connected. Accordingly, by closing some switching elements 104 and opening other switching elements 104, various antenna elements 102 can be selectively electrically connected to form different configurations. Selecting which switching elements 104 are closed enables the antenna system 100 to implement a wide variety of different antenna shapes, including but not limited to loops, dipoles, stubs, etc. The antenna elements 102 need not be electrically connected to other antenna elements 102 to affect the performance of the antenna system 100. Rather, each antenna element 102 forms part of the antenna system 100 regardless of whether the antenna element 102 is electrically connected to adjacent antenna elements 102.

A control arrangement 106 selects particular switching elements 104 to be opened or closed to form a selected antenna configuration. The control arrangement 106 is operatively coupled to the switching elements 104 via control lines, e.g., a control bus 108. The control arrangement 106 may incorporate, for example, a processor and a switch control module.

To select particular switching elements 104 to be opened or closed, the control arrangement 106 selects an antenna configuration. When the antenna system 100 is first activated, the control arrangement 106 searches the conceptual space of possible antenna configurations to identify an antenna configuration that will produce acceptable antenna performance under the prevailing operating conditions. To increase the speed of the search process, a memory 110 stores antenna configurations, e.g., switch states, that are expected to produce acceptable antenna performance.

The memory 110 is operatively coupled to the control arrangement 106, for example, via an address bus 112 and a data bus 114. The memory 110 may be implemented using any of a variety of conventional memory devices, including, but not limited to, random access memory (RAM) devices, static random access memory (SRAM) devices, dynamic random access memory (DRAM) devices, non-volatile random access memory (NVRAM) devices, and non-volatile programmable memories, such as programmable read only memory (PROM) devices and EEPROM devices. The memory 110 may also be implemented using a magnetic disk device or other data storage medium.

The memory 110 can store the antenna configurations or switch states using any of a variety of representations. In some embodiments, each switching element 104 may be represented by a bit having a value of 1 if the switching element 104 is open or a value of 0 if the switching element 104 is closed in a particular antenna configuration. Accordingly, each antenna configuration is stored as a binary word having a number of bits equal to the number of switching elements 104 in the antenna system 100. The example antenna system 100 illustrated in FIG. 1 includes seventeen switching elements 104. Therefore, in such embodiments, each antenna configuration would be represented as a 17-bit binary word.

In some embodiments, multiple switching elements 104 may be controlled to assume the same open or closed state as a group. For example, as the antenna system 100 develops usage history, the control arrangement 106 may determine that performance benefits may result when certain groups of antenna elements 102 are electrically connected or disconnected. Alternatively, the determination to control such switching elements 104 as a group may be made at the time of manufacture of the antenna system 100. For example, certain zones formed by groups of antenna elements 102 may be controlled as a group for different frequency bands. When multiple switching elements 104 are controlled as a group, smaller binary words can represent antenna configurations or switch states. This more compact representation may yield certain benefits, particularly when the determination to control switching elements 104 as a group is made at the time of manufacture. In this case, the memory 110 may be implemented using a device having less storage capacity, potentially resulting in decreased manufacturing costs.

As the antenna system 100 is used, the control arrangement 106 updates the memory 110 to improve subsequent iterations of the search process. The control arrangement 106 causes the memory 110 to store binary words that represent the switch states for antenna configurations that are determined to produce acceptable antenna characteristics. Accordingly, when the control arrangement 106 repeats the search process, e.g., when the antenna system 100 is reactivated after having been deactivated, the search process can begin at an antenna configuration that is known to produce acceptable results. In conventional antenna systems lacking a memory 110, historical information is lost after each iteration of the search process, for example, every time the communication system is turned off or tuned to a different communication band. In such conventional antenna systems, the search process begins anew with each iteration. By contrast, storing and using historical information relating to previous iterations of the search process can improve the speed of the search process.

The control arrangement 106 may read or update the memory 110 based on a control signal provided by a receiver 116, for example, when the communication system is activated. This control signal may be, for example, a received signal strength indicator (RSSI) signal generated as a function of an RF signal received by the receiver 116. Alternatively, the control signal may be generated as a function of an operational mode of the antenna system 100, e.g., whether the antenna system 100 is to be configured to receive an AM or FM signal; a UHF or VHF television signal; a remote function access (RFA) signal; a CDMA, GSM, or other wireless data and voice communications signal; a global positioning system (GPS) signal; or a satellite-based digital audio radio services (SDARS) signal. The control signal may also be generated as a function of the particular frequency or frequency band to which the receiver 116 is tuned.

When the control arrangement 106 receives the control signal from the receiver 116, the control arrangement 106 initiates the search process to select an antenna configuration in response to the control signal. The control arrangement 106 then addresses the memory 110 via the address bus 112 to access the binary word stored in the memory 110 that corresponds to the selected antenna configuration. The control arrangement 106 receives the binary word via the data bus 114 and, based on the binary word, outputs appropriate switch control signals to the switching elements 104 via the control bus 108. The switch control signals selectively open or close the switching elements 104 as appropriate.

Figure 2:
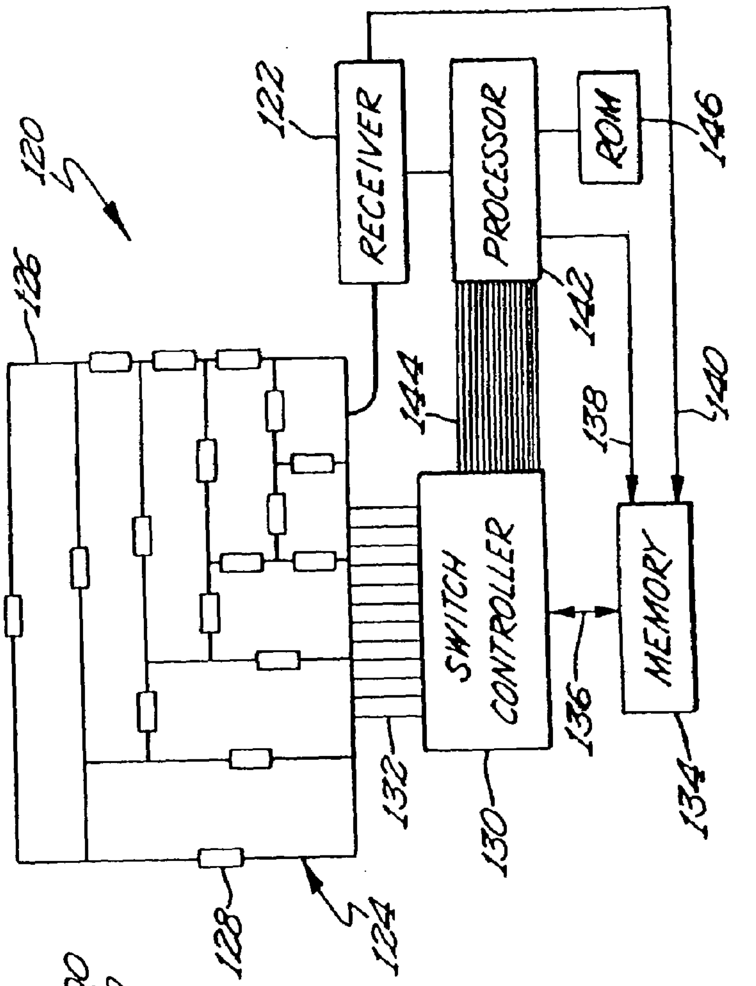
FIG. 2 is a block diagram illustrating an example communication system according to another embodiment.

FIG. 2 is a block diagram illustrating an example communication system 120 according to another embodiment. While not required, the communication system 120 may be installed in an automobile or other vehicle. Alternatively, the communication system 120 may be implemented as a standalone unit, e.g., a portable entertainment system. A receiver 122 receives a radiated electromagnetic signal, such as an RF signal, via an antenna 124. Depending on the particular application, the radiated electromagnetic signal can be of any of a variety of types, including but not limited to an AM or FM radio signal; a UHF or VHF television signal; an RFA signal; a CDMA, GSM, or other wireless data and voice communications signal; a GPS signal; or an SDARS signal.

The antenna 124 includes antenna elements 126 that are arranged to receive the radiated electromagnetic signal. The antenna elements 126 are arranged with switching elements 128 in a pattern, such as the example pattern depicted in FIG. 2. Patterns other than the example pattern illustrated in FIG. 2 may be formed by the arrangement of the antenna elements 126 and the switching elements 128. Such alternative patterns can be designed for acceptable performance under certain operating conditions. The antenna elements 126, indicated by solid line segments in FIG. 2, can be implemented by wires or other conductors, including but not limited to conductive traces. Patches or other radiating devices may also be used to implement one or more of the antenna elements 126. The switching elements 128, indicated by rectangles in FIG. 2, can be placed in an open state or a closed state via application of an appropriate control voltage or control signal. The switching elements 128 may be implemented using bipolar junction transistors (BJTs), field-effect transistors (FETs), or a combination of BJTs and FETs and possibly other devices, such as integrated circuits (ICs). As another alternative, the switching elements 128 can be implemented using relays or other mechanical devices. For purposes of clarity, control terminals and control lines connected to individual switching elements 128 are not illustrated.

The antenna elements 126 can be electrically connected to or disconnected from one another by closing or opening appropriate switching elements 128. In this way, the antenna 124 can implement a wide variety of different antenna configurations, including but not limited to loops, dipoles, stubs, etc. The antenna elements 126 need not be electrically connected to other antenna elements 126 to affect the performance of the antenna 124. Rather, each antenna element 126 forms part of the antenna 124 regardless of whether the antenna element 126 is electrically connected to adjacent antenna elements 126.

A switch controller 130 provides control signals to the switching elements 128 to selectively open or close the switching elements 128 to implement particular antenna configurations. The switch controller 130 is operatively coupled to the switching elements 128 via control lines 132.

The switch controller 130 is also operatively coupled to a memory 134, for example, via a bus 136. The memory 134 stores antenna configurations or switch states and is addressable using lines 138 or lines 140. It should be noted that the memory 134 need not store all possible antenna configurations or switch states. For many applications, it would be sufficient for the memory 134 to store up to a few hundred of the possible antenna configurations or switch states. Accordingly, any of a variety of conventional memory devices may implement the memory 134, including, but not limited to, RAM devices, SRAM devices, DRAM devices, NVRAM devices, and non-volatile programmable memories, such as PROM devices and EEPROM devices. The memory 134 may also be implemented using a magnetic disk device or other data storage medium.

The memory 134 can store the antenna configurations or switch states using any of a variety of representations. In some embodiments, each switching element 128 may be represented by a bit having a value of 1 if the switching element 128 is open or a value of 0 if the switching element 128 is closed in a particular antenna configuration. Accordingly, each antenna configuration is stored as a binary word having a number of bits equal to the number of switching elements 128 in the antenna 124. The example antenna 124 illustrated in FIG. 2 includes seventeen switching elements 128. Therefore, in such embodiments, each antenna configuration would be represented as a 17-bit binary word. As described above in connection with FIG. 1, a single bit can represent groups of multiple switching elements 128 that are consistently controlled as a unit.

In operation, a processor 142 selects an antenna configuration appropriate to the operational state of the communication system 120, e.g., the type of radiated electromagnetic signal received by the receiver 122 or the particular frequency or frequency band in which the communication system 120 is operating. For example, the receiver 122 may provide a control signal to the processor 142 or the memory 134 that indicates the operational mode of the antenna 124, e.g., whether the antenna 124 is to be configured to receive an AM or FM signal; a UHF or VHF television signal; a remote function access (RFA) signal; a CDMA, GSM, or other wireless data and voice communications signal; a global positioning system (GPS) signal; or a satellite-based digital audio radio services (SDARS) signal. The receiver 122 may also generate the control signal as a function of the particular frequency or frequency band to which the receiver 122 is tuned. The control signal may also indicate certain strength or directional characteristics of the radiated electromagnetic signal. For example, the receiver 122 may provide a received signal strength indicator (RSSI) signal to the processor 142.

The processor 142 responds to the control signal by initiating a search process of the conceptual space of possible antenna configurations to select an appropriate antenna configuration. Rather than beginning at a randomly selected antenna configuration each time the search process is initiated, the processor 142 starts the search process at a switch configuration that is known to have produced acceptable antenna characteristics under the prevailing operating conditions at some point during the usage history of the communication system 120. For example, the processor 142 may address the memory 134 to retrieve a default switch configuration for a given operating frequency. If the default configuration produces acceptable antenna characteristics, the processor 142 uses the default switch configuration. On the other hand, if the default switch configuration no longer produces acceptable antenna characteristics, the processor 142 searches for a new switch configuration using the default switch configuration as a starting point. Once the processor 142 finds the new switch configuration, the processor 142 updates the memory 134 via the lines 138 to replace the default switch configuration with the new switch configuration.

Regardless of whether the processor 142 selects the default switch configuration or another switch configuration, the processor 142 indicates the selected switch configuration to the switch controller 130 via lines 144. The switch controller 130 then addresses the memory 134 via the bus 136 to access the binary word stored in the memory 134 that corresponds to the selected antenna configuration. The switch controller 130 receives the binary word via the bus 136 and, based on the binary word, outputs appropriate switch control signals to the switching elements 128 via the control lines 132. The switch control signals selectively open or close the switching elements 128 as appropriate, thereby forming the selected antenna configuration.

The processor 142 is typically configured to operate with one or more types of processor readable media, such as a read-only memory (ROM) device 146. Processor readable media can be any available media that can be accessed by the processor 142 and includes both volatile and nonvolatile media, removable and non-removable media. By way of example, and not limitation, processor readable media may include storage media and communication media. Storage media includes both volatile and nonvolatile, removable and nonremovable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the processor 142. Communication media typically embodies processor-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

Figure 3:
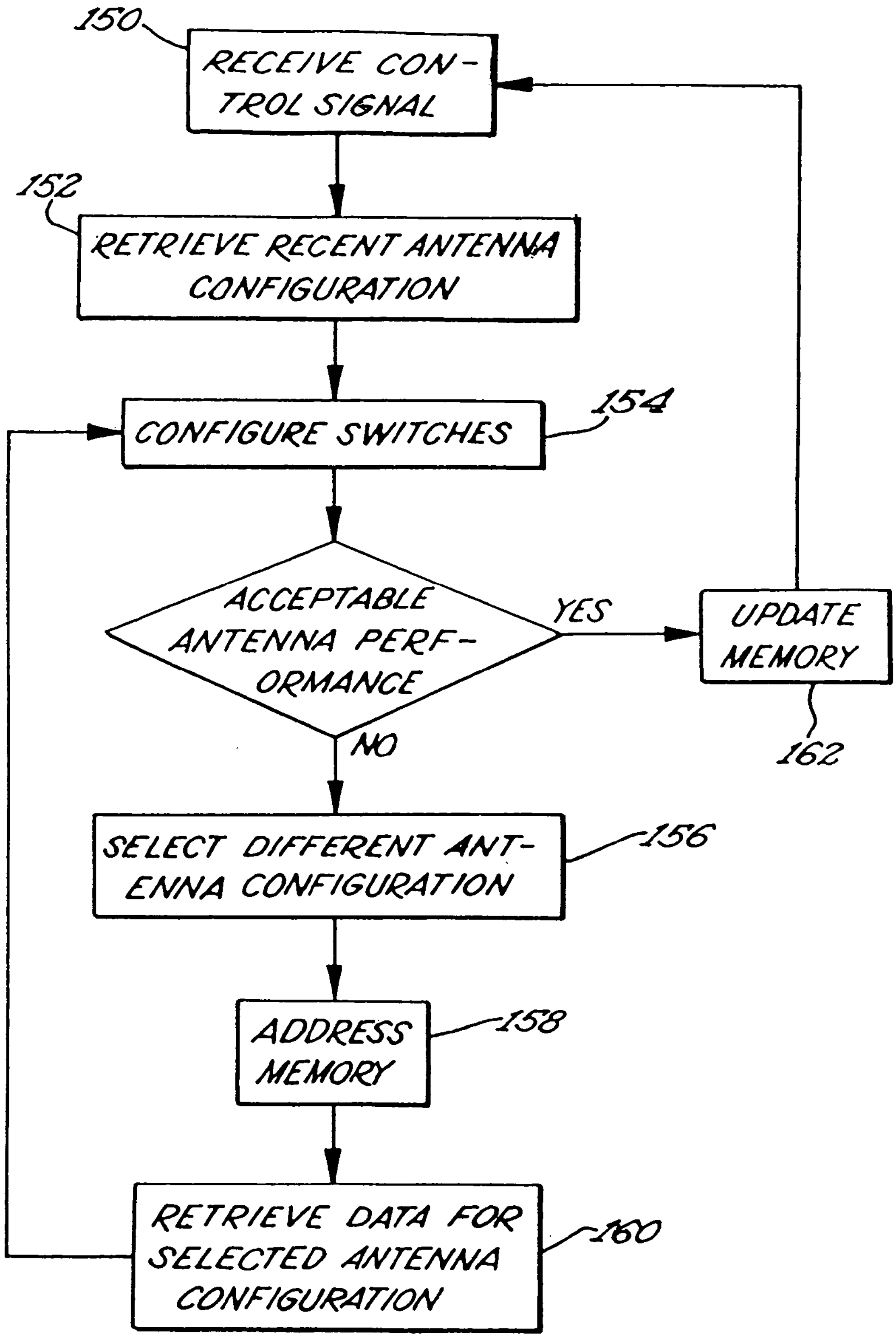
FIG. 3 is a flow diagram illustrating an example method to configure an antenna system according to yet another embodiment.

FIG. 3 is a flow diagram illustrating an example method for configuring the antenna 124, according to another embodiment. The method may be performed, for example, in accordance with processor-readable instructions stored in the ROM 146 of FIG. 2. First, the processor 142 receives a control signal (150) from the receiver 122. As described above in connection with FIG. 2, the control signal may indicate the operational mode of the antenna 124, e.g., the particular frequency or frequency band to which the receiver 122 is tuned. Alternatively, the control signal may indicate the impedance of the antenna 124. The control signal may also be an RSSI signal or other signal indicating certain strength or directional characteristics of the radiated electromagnetic signal. In addition, the control signal may be generated by a remote receiver other than the receiver 122, for example, to enable improved reception at the remote receiver.

In response to the control signal, the processor 142 selects an appropriate antenna configuration. Specifically, the processor 142 accesses the memory 134 to retrieve a recent antenna configuration (152), such as a default antenna configuration, that has produced or is expected to produce acceptable antenna characteristics in the current operational mode, e.g., for the current operating frequency or frequency band.

The processor 142 then configures the switching elements 128 to produce the antenna configuration (154) by controlling the memory 134 to output data representing the antenna configuration. Based on this data, the switch controller 130 drives each switching element 128 to an open state or a closed state, as appropriate.

The processor 142 evaluates the performance of the selected antenna configuration, for example, using an RSSI or other feedback signal provided by the receiver 122. If the selected antenna configuration produces acceptable antenna characteristics, the processor 142 uses that antenna configuration.

On the other hand, if the selected antenna configuration does not produce acceptable antenna characteristics, the processor 142 selects a different antenna configuration (156). The processor 142 addresses (158) the memory 134 and retrieves data representing the newly selected antenna configuration (160). Next, the processor 142 configures the switching elements 128 to produce the newly selected antenna configuration (154) and again evaluates the performance of the antenna configuration.

When the processor 142 identifies an antenna configuration that produces acceptable antenna characteristics, the processor 142 uses that antenna configuration. In addition, the processor 142 updates the memory 134 to replace the previously stored antenna configuration with the new antenna configuration (162). In this way, the communication system 120 adapts to changing environmental conditions, as well as changing conditions relating to the antenna 124 itself. For example, as the communication system 120 ages, certain antenna elements 126 or switching elements 128 may exhibit declining performance or stop functioning entirely. Accordingly, certain switch configurations that once produced acceptable antenna characteristics may no longer work as well. By updating the memory 134, such switch configurations can be eliminated from further consideration.

As demonstrated by the foregoing discussion, various embodiments may provide certain advantages. For instance, using the stored antenna configurations as a starting point for the process of searching for an antenna configuration that produces acceptable antenna characteristics under particular operating conditions may reduce the search time.

It will be understood by those skilled in the art that various modifications and improvements may be made without departing from the spirit and scope of the disclosed embodiments. The scope of protection afforded is to be determined solely by the claims and by the breadth of interpretation allowed by law.

What is claimed is:

1. An antenna system comprising:

a plurality of antenna elements;

a plurality of switching elements arranged with the antenna elements to, when selectively closed, electrically couple selected ones of the antenna elements to one another to generate an antenna configuration selected from a plurality of antenna configurations;

a non-volatile memory configured to store data representing at least some of the plurality of antenna configurations;

a control arrangement operatively coupled to the plurality of switching elements and configured to close selected ones of the switching elements as a function of the data stored in said memory; and means operative to selectively update said data on a function of previously selected antenna configurations.

2. The antenna system of claim 1, wherein the control arrangement is coupled to receive a control signal and configured to:

select the antenna configuration from the plurality of antenna configurations in response to the control signal;

select the selected ones of the switching elements as a function of the selected antenna configuration; and provide a switch control signal to the selected ones of the switching elements to close the selected ones of the switching elements.

3. The antenna system of claim 2, wherein the control signal comprises one of a received signal strength indicator (RSSI) signal, an antenna impedance indicator signal, and a control signal received from a remote receiver.

4. The antenna system of claim 2, wherein the control signal is generated as a function of an operational mode of the antenna system.

5. The antenna system of claim 4, wherein the operational mode is selected from the group consisting of AM radio, FM radio, television, remote function access (RFA), wireless data and voice communications, global positioning system (GPS), and satellite-based digital audio radio services (SDARS).

6. The antenna system of claim 2, wherein the control signal is generated as a function of a tuned frequency.

7. The antenna system of claim 2, wherein the control signal is generated in response to activating a vehicle communication system.

8. The antenna system of claim 2, wherein the control arrangement comprises:

a processor arrangement configured to select the antenna configuration from the plurality of antenna configurations in response to the control signal; and a switch controller operatively coupled to the plurality of switching elements and to the processor arrangement and configured to close the selected ones of the switching elements as a function of the selected antenna configuration.

9. A communication system comprising:

a receiver configured to generate a control signal in response to a radiated electromagnetic signal;

a plurality of antenna elements operatively coupled to the receiver and arranged to receive the radiated electromagnetic signal;

a plurality of switching elements arranged with the antenna elements to, when selectively closed, electrically couple selected ones of the antenna elements to one another;

a non-volatile memory configured to store data representing a plurality of antenna configurations;

a processor arrangement operatively coupled to the memory and operatively coupled to receive the control signal and configured to select an antenna configuration from the plurality of antenna configurations as a function of previously selected antenna configurations in response to the control signal and to selectively update the data stored in the memory in response to the control signal; and a switch controller operatively coupled to the plurality of switching elements and to the processor arrangement and configured to close selected ones of the switching elements as a function of the selected antenna configuration.

10. The communication system of claim 9, wherein the control signal comprises one of a received signal strength indicator (RSSI) signal, an antenna impedance indicator signal, and a control signal received from a remote receiver.

11. The communication system of claim 9, wherein the receiver is configured to generate the control signal as a function of an operational mode of the antenna system.

12. The communication system of claim 11, wherein the operational mode is selected from the group consisting of AM radio, FM radio, television, remote function access (RFA), wireless data and voice communications, global positioning system (GPS), and satellite-based digital audio radio services (SDARS).

13. The communication system of claim 9, wherein the receiver is configured to generate the control signal as a function of a tuned frequency.

14. The communication system of claim 9, wherein the receiver is configured to generate the control signal in response to being activated.

15. A method of configuring an antenna system comprising a plurality of antenna elements, the method comprising:

receiving a control signal;

selecting an antenna configuration from a plurality of antenna configurations in response to the control signal;

controlling a non-volatile memory to output data representing the selected antenna configuration as a function of previously selected antenna configurations;

configuring a plurality of switching elements in response to the output data to electrically couple selected ones of the plurality of antenna elements to one another, thereby generating the selected antenna configuration; and updating the data stored in the memory as a function of the control signal.

16. The method of claim 15, further comprising:

selecting at least one of the plurality of switching elements as a function of the selected antenna configuration; and provide a switch control signal to the selected ones of the switching elements to close the selected ones of the switching elements.

17. The method of claim 15, wherein the control signal comprises one of a received signal strength indicator (RSSI) signal, an antenna impedance indicator signal, and a control signal received from a remote receiver.

18. The method of claim 15, wherein the control signal is generated as a function of an operational mode of the antenna system.

19. The method of claim 18, wherein the operational mode is selected from the group consisting of AM radio, FM radio, television, remote function access (RFA), wireless data and voice communications, global positioning system (GPS), and satellite-based digital audio radio services (SDARS).

20. The method of claim 15, wherein the control signal is generated as a function of a tuned frequency.

21. The method of claim 15, wherein the control signal is generated in response to activating a vehicle communication system.

22. A processor-readable medium having processor-executable instructions for:

selecting an antenna configuration from a plurality of antenna configurations in response to a control signal and as a function of previously selected antenna configurations;

controlling a non-volatile memory to output data representing the selected antenna configuration;

configuring a plurality of switching elements in response to the output data to electrically couple selected ones of a plurality of antenna elements to one another, thereby generating the selected antenna configuration; and updating the data stored in the memory as a function of the control signal.

23. The processor-readable medium of claim 22, having further processor-executable instructions for:

selecting at least one of the plurality of switching elements as a function of the selected antenna configuration; and providing a switch control signal to the selected ones of the switching elements to close the selected ones of the switching elements.

24. The processor-readable medium of claim 22, wherein the control signal comprises one of a received signal strength indicator (RSSI) signal, an antenna impedance indicator signal, and a control signal received from a remote receiver.

25. The processor-readable medium of claim 22, wherein the control signal is generated as a function of an operational mode of the antenna system.

26. The processor-readable medium of claim 25, wherein the operational mode is selected from the group consisting of AM radio, FM radio, television, remote function access (RFA), wireless data and voice communications, global positioning system (GPS), and satellite-based digital audio radio services (SDARS).

27. The processor-readable medium of claim 22, wherein the control signal is generated as a function of a tuned frequency.

28. The processor-readable medium of claim 22, wherein the control signal is generated in response to activating a vehicle communication system.

* * * * *